US008462689B2

(12) United States Patent
Johnson et al.

(10) Patent No.: US 8,462,689 B2
(45) Date of Patent: Jun. 11, 2013

(54) RECEIVER FOR TIME DIVISION MULTIPLEX SYSTEM WITHOUT EXPLICIT TIME SLOT ASSIGNMENT

(75) Inventors: Kevin P. Johnson, Palm Bay, FL (US); Antoine J. Rouphael, Escondido, CA (US); George Rodney Nelson, Jr., Merritt Island, FL (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 11/022,353

(22) Filed: Dec. 22, 2004

(65) Prior Publication Data

US 2005/0105547 A1    May 19, 2005

Related U.S. Application Data

(63) Continuation of application No. 10/266,079, filed on Oct. 7, 2002, now Pat. No. 6,845,104, which is a continuation-in-part of application No. 09/594,112, filed on Jun. 14, 2000, now Pat. No. 6,463,074.

(51) Int. Cl.
*H04W 4/00*   (2009.01)
*H04B 7/216*  (2006.01)
*H04B 7/10*   (2006.01)

(52) U.S. Cl.
USPC ........... 370/314; 370/320; 370/335; 370/336; 370/342; 370/347; 375/138; 375/200; 375/347

(58) Field of Classification Search
USPC .......................... 370/228–468; 375/138–247
See application file for complete search history.

(56) References Cited

U.S. PATENT DOCUMENTS 3,787,631 A   1/1974   Lewis
3,967,072 A   6/1976   Dimmick et al.
(Continued)

FOREIGN PATENT DOCUMENTS

WO          01/97418      12/2001

OTHER PUBLICATIONS

Third Generation Partnership Project, "Technical Specification Group Radio Access Network; Physical layer procedures (FDD) (Release 1999)," 3G TS 25.214 V3.2.0 (Mar. 2000).

(Continued)

*Primary Examiner* — Phirin Sam
*Assistant Examiner* — Venkatesh Haliyur
(74) *Attorney, Agent, or Firm* — Blakely, Sokoloff, Taylor & Zafman LLP

(57) ABSTRACT

A technique for a time division multiplex system in which access to shared broadcast communication media is granted on a demand basis. Particular connections are assigned slot times at the transmitter based on demand. However, no specific information regarding the assignment of time slots need be communicated to the receivers. The transmit side employs a forward error correction technique followed by multiplication by a cover sequence unique to each connection. All receivers listen to the broadcast transmission channel all of the time. The receiver assigned to each connection decodes the signals in such a manner that only the receiver with the correct cover sequence assigned to a particular connection will successfully decode the data associated with that connection. Data frames that fail the forward error correction process are discarded, and only those frames which are successfully decoded are passed up to a higher layer. The occurrence of an erroneously received frame is not necessarily always reported to the transmit side of the connection; only a packet level error indication is made. In this way, information containing time slot assignment need not be communicated between the transmitter and receiver, and yet data will be correctly received.

31 Claims, 6 Drawing Sheets

U.S. PATENT DOCUMENTS

| | | | |
|---|---|---|---|
| 4,601,029 A | 7/1986 | Hargrave et al. | |
| 4,763,322 A | 8/1988 | Eizenhöfer | |
| 4,809,155 A | 2/1989 | Costes et al. | |
| 4,855,996 A | 8/1989 | Douskalis | |
| 5,005,170 A | 4/1991 | Nelson | |
| 5,130,975 A | 7/1992 | Akata | |
| 5,218,680 A | 6/1993 | Farrell et al. | |
| 5,278,892 A * | 1/1994 | Bolliger et al. | 455/442 |
| 5,309,474 A | 5/1994 | Gilhousen et al. | 370/209 |
| 5,359,320 A | 10/1994 | Jaffe et al. | |
| 5,369,664 A | 11/1994 | Takahashi et al. | |
| 5,398,247 A | 3/1995 | Delprat et al. | |
| 5,416,797 A * | 5/1995 | Gilhousen et al. | 370/209 |
| 5,428,613 A | 6/1995 | Spiotta et al. | |
| 5,570,355 A | 10/1996 | Dail et al. | |
| 5,598,417 A | 1/1997 | Crisler et al. | |
| 5,614,914 A * | 3/1997 | Bolgiano et al. | 342/364 |
| 5,619,526 A * | 4/1997 | Kim et al. | 370/335 |
| 5,640,395 A | 6/1997 | Hamalainen et al. | |
| 5,648,962 A | 7/1997 | Pirinen | |
| 5,663,900 A * | 9/1997 | Bhandari et al. | 716/17 |
| 5,663,990 A * | 9/1997 | Bolgiano et al. | 375/138 |
| 5,671,221 A * | 9/1997 | Yang | 370/320 |
| 5,687,198 A * | 11/1997 | Sexton et al. | 375/347 |
| 5,691,974 A | 11/1997 | Zehavi et al. | |
| 5,703,902 A * | 12/1997 | Ziv et al. | 375/228 |
| 5,729,535 A * | 3/1998 | Rostoker et al. | 370/328 |
| 5,729,540 A * | 3/1998 | Wegrzyn | 370/336 |
| 5,745,837 A * | 4/1998 | Fuhrmann | 725/114 |
| 5,748,624 A | 5/1998 | Kondo | |
| 5,754,657 A * | 5/1998 | Schipper et al. | 380/258 |
| 5,793,416 A * | 8/1998 | Rostoker et al. | 348/14.13 |
| 5,841,806 A * | 11/1998 | Gilhousen et al. | 375/146 |
| 5,859,879 A * | 1/1999 | Bolgiano et al. | 370/330 |
| 5,881,099 A | 3/1999 | Takahashi et al. | |
| 5,886,989 A * | 3/1999 | Evans et al. | 370/347 |
| 5,930,262 A | 7/1999 | Sierens et al. | |
| 5,943,361 A * | 8/1999 | Gilhousen et al. | 375/142 |
| 5,946,306 A | 8/1999 | Talarmo | |
| 5,963,557 A * | 10/1999 | Eng | 370/432 |
| 5,991,308 A * | 11/1999 | Fuhrmann et al. | 370/395.53 |
| 6,111,863 A * | 8/2000 | Rostoker et al. | 370/329 |
| 6,115,389 A | 9/2000 | Mahale et al. | |
| 6,157,614 A * | 12/2000 | Pasternak et al. | 370/236 |
| 6,185,199 B1 * | 2/2001 | Zehavi | 370/335 |
| 6,256,321 B1 * | 7/2001 | Kobayashi | 370/464 |
| 6,266,014 B1 * | 7/2001 | Fattouche et al. | 342/450 |
| 6,282,187 B1 | 8/2001 | Evans et al. | |
| 6,370,153 B1 * | 4/2002 | Eng | 370/438 |
| 6,373,831 B1 | 4/2002 | Secord et al. | |
| 6,381,211 B1 | 4/2002 | Lysejko et al. | |
| 6,393,012 B1 * | 5/2002 | Pankaj | 370/342 |
| 6,404,732 B1 * | 6/2002 | van Nee | 370/209 |
| 6,463,074 B1 * | 10/2002 | Johnson et al. | 370/442 |
| 6,463,097 B1 * | 10/2002 | Held et al. | 375/225 |
| 6,466,564 B1 * | 10/2002 | Rakib et al. | 370/342 |
| 6,522,683 B1 * | 2/2003 | Smee et al. | 375/144 |
| 6,553,231 B1 * | 4/2003 | Karlsson et al. | 455/436 |
| 6,567,390 B1 * | 5/2003 | Banister et al. | 370/342 |
| 6,587,517 B1 * | 7/2003 | Li et al. | 375/316 |
| 6,590,885 B1 * | 7/2003 | Jorgensen | 370/338 |
| 6,661,833 B1 * | 12/2003 | Black et al. | 375/147 |
| 6,687,233 B1 * | 2/2004 | Chen et al. | 370/253 |
| 6,693,951 B1 * | 2/2004 | Gilhousen et al. | 375/130 |
| 6,714,597 B1 * | 3/2004 | Antonio et al. | 375/296 |
| 6,757,334 B1 * | 6/2004 | Feher | 375/259 |
| 6,757,531 B1 * | 6/2004 | Haaramo et al. | 455/414.1 |
| 6,798,736 B1 * | 9/2004 | Black et al. | 370/208 |
| 6,845,104 B2 * | 1/2005 | Johnson et al. | 370/442 |
| 6,925,070 B2 * | 8/2005 | Proctor, Jr. | 370/335 |
| 6,937,643 B2 * | 8/2005 | Li et al. | 375/147 |
| 6,954,448 B2 * | 10/2005 | Farley et al. | 370/337 |
| 6,967,998 B1 * | 11/2005 | Chen et al. | 375/224 |
| 7,020,111 B2 * | 3/2006 | Ozluturk et al. | 370/335 |
| 7,054,296 B1 * | 5/2006 | Sorrells et al. | 370/338 |
| 7,058,027 B1 * | 6/2006 | Alessi et al. | 370/310.1 |
| 7,072,380 B2 * | 7/2006 | Ozluturk et al. | 375/141 |
| 7,292,552 B2 * | 11/2007 | Willenegger et al. | 370/333 |
| 7,392,279 B1 * | 6/2008 | Chandran et al. | 709/200 |
| 7,512,102 B2 * | 3/2009 | Cornett, Jr. et al. | 370/337 |
| 7,929,498 B2 * | 4/2011 | Ozluturk et al. | 370/335 |
| 8,320,298 B2 * | 11/2012 | Cornett, Jr. et al. | 370/321 |
| 8,327,396 B2 * | 12/2012 | Ramaswamy et al. | 725/19 |
| 2002/0013135 A1 * | 1/2002 | Proctor, Jr. | 455/228 |
| 2002/0057713 A1 * | 5/2002 | Bagchi et al. | 370/468 |
| 2002/0101839 A1 * | 8/2002 | Farley et al. | 370/329 |
| 2003/0086416 A1 * | 5/2003 | Watanabe et al. | 370/352 |
| 2003/0165155 A1 * | 9/2003 | Johnson et al. | 370/442 |
| 2003/0176191 A1 * | 9/2003 | Cornett, Jr. et al. | 455/445 |
| 2003/0189916 A1 * | 10/2003 | Cornett, Jr. et al. | 370/345 |
| 2003/0202565 A1 * | 10/2003 | Li et al. | 375/147 |
| 2005/0105547 A1 * | 5/2005 | Johnson et al. | 370/458 |
| 2005/0193309 A1 * | 9/2005 | Grilli et al. | 714/752 |
| 2008/0318557 A1 * | 12/2008 | Poulson et al. | 455/414.1 |
| 2009/0070797 A1 * | 3/2009 | Ramaswamy et al. | 725/10 |
| 2009/0225718 A1 * | 9/2009 | Cornett, Jr. et al. | 370/329 |
| 2011/0194537 A1 * | 8/2011 | Proctor, Jr. | 370/335 |

OTHER PUBLICATIONS

Third Generation Partnership Project, "Technical Specification Group Radio Access Network; Radio Interface Protocol Architecture (Release 1999)," 3G TS 25.301 V3.4.0 (Mar. 2000).

Third Generation Partnership Project, "Technical Specification Group Radio Access Network; MAC protocol specification (Release 1999)," 3G TS 25.321 V3.3.0 (Mar. 2000).

Third Generation Partnership Project, "Technical Specification Group Radio Access Network; RLC Protocol Specification (Release 1999)," 3G TS 25.322 V3.2.0 (Mar. 2000).

Third Generation Partnership Project, "Technical Specification Group Radio Access Network; RRC Protocol Specification (Release 1999)," 3G TS 25.331 V3.2.0 (Mar. 2000).

Third Generation Partnership Project, "Technical Specification Group Radio Access Network; Multiplexing and channel coding (FDD) (Release 1999)," 3G TS 25.212 V3.2.0 (Mar. 2000).

Third Generation Partnership Project, "Technical Specification Group Radio Access Network; Physical channels and mapping of transport channels onto physical channels (FDD) (Release 1999)," 3G TS 25.211 V3.2.0 (Mar. 2000).

* cited by examiner

RECEIVER FOR TIME DIVISION MULTIPLEX SYSTEM WITHOUT EXPLICIT TIME SLOT ASSIGNMENT

RELATED APPLICATIONS

This application is a continuation of U.S. application Ser. No. 10/266,079, filed Oct. 7, 2002 now U.S. Pat. No. 6,845,104, which is a continuation-in-part of U.S. application Ser. No. 09/594,112, filed Jun. 14, 2000, now U.S. Pat. No. 6,463,074, issued Oct. 8, 2002. The entire teachings of the above applications are incorporated herein by reference.

BACKGROUND

Continued growth in the electronics and computer industries, and indeed growth in the economy in general, is increasingly attributed to the demand for access to the Internet and myriad of services and features that it provides. The proliferation in the use of computing equipment, both of the conventional desk top variety as well as of the portable variety, including laptop computers, hand-held Personal Digital Assistants (PDAs), Internet enabled cellular telephones and other access devices have resulted in a corresponding increase in demand for network infrastructure.

The access points into the Internet are, however, mostly provided via communication systems that were originally intended for carrying non-data traffic. For example, the Public Switched Telephone Network (PSTN) is still heavily used as a dial-up access point for many home and personal users. Although there are emerging various standards that provide higher speed access points, these emerging technologies, as well as older high speed technologies such as TI and/or fractional TI services still make use of the telephone network. The telephone network was, unfortunately, optimized to carry voice traffic as opposed to data traffic. In particular, these networks were intended to support continuous analog communications, as compared to the digital communication protocols needed for Internet packet-oriented communications.

For example, voice grade services typically require access to a communication channel bandwidth of approximately 3 kilohertz (kHz). While techniques do exist for communicating data over such radio channels at a rate of 9.6 kilobits per second (kbps), such low bandwidth channels do not lend themselves directly to efficient transmission of data at the typical rates of 56.6 kbps or higher that are now commonly expected.

In addition, the very nature of Internet traffic itself is different from the nature of voice traffic. Voice communication requires a continuous duplex connection, that is, a user at one end of a connection expects to be able to transmit and receive to a user at the other end of a connection continuously, while at the same the user at the other end is also transmitting and receiving.

Usage patterns of the Internet are also quite different from voice communications. For example, consider that access to Web pages over the Internet in general is burst-oriented. Typically, the user of a remote client computer first specifies the address of a Web page to a browser program. The browser program at the client computer then sends the request as a Transmission Control Protocol (TCP)/Internet Protocol (IP) message packet, which is typically about 1000 bytes in length, to a network Web server. The Web server then responds by sending the content of the requested Web page, which may include anywhere from approximately 10 kilobytes to several megabytes of text, image, audio or video data. Because of delays inherent in the network, and because the Internet is such a vast interconnected mesh of networks, users experience delays of several seconds or more for the requested web page to be routed to them. The user may thereafter spend several seconds or even several minutes reading the contents of the page before specifying a next page to be downloaded.

The result is that a typical Internet connection remains idle for a relatively long period of time. However, once a request is made, the user expects the information to be transmitted to the client at a relatively rapid rate. An additional difficulty is provided in wireless access systems in that there are typically many more potential users or subscribers than the available number of physical radio channels. Therefore, making wireless channels available only on an instantaneous "as needed" basis makes sense, and indeed is a requirement if wireless data transfer services are to efficiently operate. Thus, dynamic traffic channel allocation schemes are one way to increase the efficiency of wireless data communication systems in an effort to more efficiently utilize available channel resources.

Some type of demand-based multiple access technique is therefore typically required to make maximum use of the available wireless channels. Multiple access is often provided in the physical layer, such as by Frequency Division Multiple Access (FDMA) or by schemes that manipulate the radio frequency signal such as Time Division Multiple Access (TDMA) or Code Division Multiple Access (CDMA). In any event, the nature of the radio spectrum is such that it is a medium that is expected to be shared. This is quite dissimilar to the traditional environment for data transmission, in which a wired medium such as a telephone line or network cable is relatively inexpensive to obtain and to keep open all the time.

SUMMARY OF THE INVENTION

A particular problem occurs in existing communication systems that use on-demand multiple access techniques to permit multiple users to share a physical channel. Due to the nature of Internet communications, these techniques increasingly make use of Time Division Multiplex (TDM) to assign time slots to specific users or connections on a demand basis. In such a system, time slot assignments are communicated to a receiver either explicitly or implicitly.

In an implicit assignment system, time slots are preassigned in a fixed pattern. Therefore, receivers know when to listen for data intended for them. However, implicit assignment systems are typically not flexible enough to efficiently handle Internet traffic.

In an explicit assignment system, time slots are assigned to specific users on a demand basis by a central system controller. Information as to which time slots are assigned to which connection is then explicitly communicated from the central controller to each remote unit. The overhead associated with transmitting information as to time slot assignment is therefore information bandwidth that otherwise cannot be allocated to transmitting payload data.

Unfortunately, this situation is exacerbated in a wireless communication environment in which additional radio channels must be allocated for communicating such time slot assignment information. This is a particularly acute problem on a forward link direction of such systems, that is in the direction from the network towards the user. Most Internet traffic is typically communicated in the forward direction.

The present invention seeks to overcome these difficulties. Specifically, the invention is used in a Time Division Multiplex (TDM) communication system where a physical radio communication channel, which may be defined by CDMA codes or in other ways, is shared among multiple users or connections through the use of time slots. Time slots are allocated on a demand basis. For example, a given radio channel in a forward direction is allocated only for a predetermined time slot duration and only as needed by specific connections.

The invention overcomes certain disadvantages of prior art systems. In order to minimize overhead in the allocation of time slots to specific users, no specific time slot assignment information needs to be communicated to the receiver. However, time slot assignment may still be made on a demand basis.

This is accomplished through the use of a particular coding scheme at the transmitter, and a particular protocol at the receiver. The transmit coding scheme takes a data packet and divide it into sub-packets or frames. The frames are separately assigned to time slots at the transmitter, driven by connection demand. Each given frame is first encoded by a Forward Error Correction (FEC) code which may typically add additional bits to the frame. A user specific cover sequence, which may, for example, be a pseudonoise (PN) sequence, is added to the frame data. The FEC encoded frame is then assigned a time slot and transmitted over the shared radio channel.

At the receiver end of the connection, all receivers always attempt to receive to all frames in all time slots. As part of this receiving process, each receiver applies its specific assigned cover sequence in order to attempt to receive each frame. The candidate frame is then submitted to an inverse FEC decoding process to attempt to properly decode each frame.

A process within a first layer of the receive protocol, which may be the implementation access layer, handles the candidate frame as follows. If a frame is properly decoded, as indicated by the FEC decoding process being successfully completed, the frame is passed up to the next higher layer of the receiver protocol. However, if a frame is erroneously decoded, it is simply discarded. Most importantly, the discarded frame event does not cause any error indication to be returned to a higher layer of the protocol.

The result is that only the receivers having the correct cover sequence assigned to them will properly decode frames intended for them. Any frames decoded that are not intended for that particular receiver will therefore normally be discarded.

A higher layer of the receive protocol then takes care of the problem of erroneously discarded frames intended for the receiver and/or erroneously accepted frames that were intended for other receivers. Specifically, the higher layer protocol may determine, from information contained in a frame such as a sequence number, when such frame has been erroneously discarded or erroneously accepted. Only at this higher layer, which may be a link layer of the protocol, will a receiver issue an error indication back to the transmitter, requesting re-transmission of the packet.

There are several advantages to this arrangement.

First, only cover code information, and not time slot information, needs to be made available at each receiver. Therefore, the overhead associated with dynamic assignment and deassignment of time slots to specific receivers, such as the need for transmitting information as to time slot assignment and deassignment is eliminated.

Second, the system works especially well where the system has wireless communication or other multiple access techniques, such as Code Division Multiple Access (CDMA), to define the physical channels. Eliminating the need to transmit time slot information from the transmitter to the receiver provides for much greater flexibility on demand assignment of individual channel resources. Reducing signaling overhead demand in such systems also increases the amount of information bandwith available for carrying payload data, while decreasing the amount of channel interference, thereby increasing capacity of the system as a whole.

Figure 1:
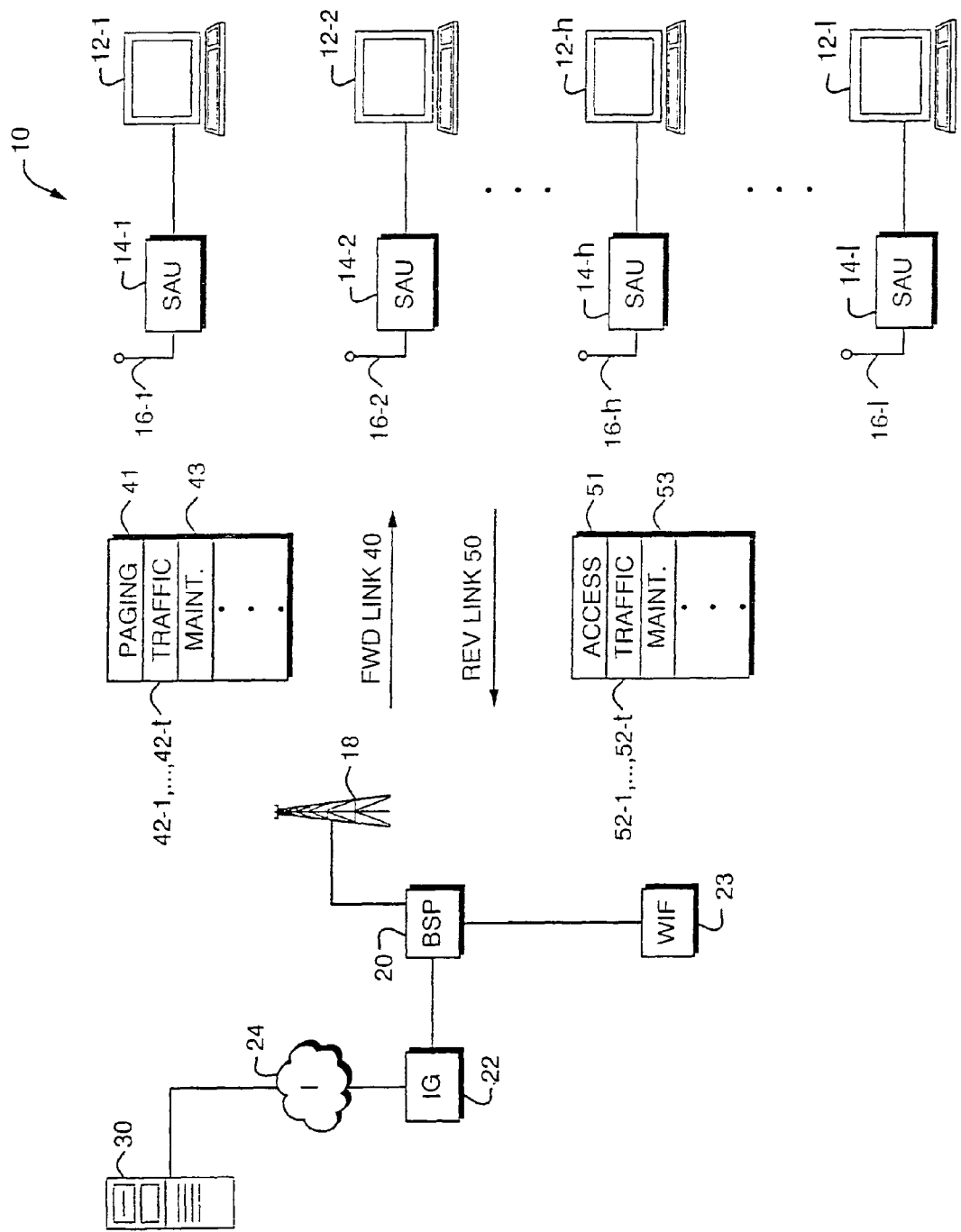
FIG. 1 is a block diagram of a communication system in which access is granted to a shared communication medium on a time division multiplex basis, without explicit time slot assignment information being made available to the receivers.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

FIG. 1 is a block diagram of a communication system 10 that makes use of Time Division Multiplexing (TDM) to allow multiple transmitters and receivers to share access to a common channel resource on a time slot basis, without the need for explicit time slot assignment information to be made available at the receiver. In the following description, the communication system 10 is described such that the shared channel resource is a wireless or radio channel. However, it should be understood that the techniques described here may be applied to allow shared access to other types of media such as telephone connections, computer network connections, cable connections, and other physical media to which access is granted on a demand driven time slot basis.

The communication system 10 includes a number of Personal Computer (PC) devices 12-1, 12-2, . . . 12-$h$, . . . 12-1, corresponding Subscriber Access Units (SAUs) 14-1, 14-2, . . . 14-$h$, . . . 14-1, and associated antennas 16-1, 16-2, . . . 16-$h$, . . . 16-1. Centrally located equipment includes a base station antenna 18, and a base station processor (BSP) 20. The BSP 20 provides connections to an from an Internet gateway 22, the Internet 24, and network file server 30. The system 10 is a demand access, point to multi-point wireless communication system such that the PCs 12 may transmit data to and receive data from network server 30 through bi-directional wireless connections implemented over forward links 40 and reverse links 50. It should be understood that in a point to multi-point multiple access wireless communication system 10 as shown, a given base station processor 20 typically supports communication with a number of different subscriber access units 14 in a manner which is similar to a cellular telephone communication network.

The PCs 12 may typically be laptop computers 12-1, handheld units 12-$h$, Internet-enabled cellular telephones or Personal Digital Assistant (PDA)-type computers. The PCs 12 are each connected to a respective SAU 14 through a suitable wired connection such as an Ethernet-type connection.

An SAU 14 permits its associated PC 12 to be connected to the network file server 30. In the reverse link direction, that is, for data traffic traveling from the PC 12 towards the server 30, the PC 12 provides an Internet Protocol (IP) level packet to the SAU 14. The SAU 14 then encapsulates the wired framing (i.e., Ethernet framing) with appropriate wireless connection framing. The appropriately formatted wireless data packet then travels over one of the radio channels that comprise the reverse link 50 through the antennas 16 and 18. At the central base station location, the BSP 20 then extracts the radio link framing, reformatting the packet in IP form and forwards it through the Internet gateway 22. The packet is then routed through any number and/or any type of TCP/IP networks, such as the Internet 24, to its ultimate destination, such as the network file server 30.

Data may also be transmitted from the network file server 30 to the PCs 12, in a forward direction. In this instance, an Internet Protocol (IP) packet originating at the file server 30 travels through the Internet 24 through the Internet gateway 22 arriving at the BSP 20. Appropriate wireless protocol framing is then added to the IP packet. The packet then travels through the antenna 18 and 16 to the intended receiver SAU 14. The receiving SAU 14 decodes the wireless packet formatting, and forwards the packet to the intended PC 12 which performs the IP layer processing.

A given PC 12 and the file server 30 can therefore be viewed as the end points of a duplex connection at the IP level. Once a connection is established, a user at the PC 12 may therefore transmit data to and receive data from the file server 30.

As will be described in greater detail later, the reverse link 50 actually consists of a number of different types of logical and/or physical radio channels including an access channel 51, multiple traffic channels 52-1, ... 52-t, and a maintenance channel 53. The reverse link access channel 51 is used by the SAUs 40 to send messages to the BSP 20 to request that traffic channels be granted to them. The assigned traffic channels 52 then carry payload data from the SAU 14 to the BSP 20. It should be understood that a given IP layer connection may actually have more than one traffic channel 52 assigned to it. In addition, a maintenance channel 53 may carry information such as synchronization and power control messages to further support transmission of information over the reverse link 50.

Similarly, the forward link 40 typically includes a paging channel 41. The paging channel 41 is used by the BSP 20 to not only inform the SAU 14 that forward link traffic channels 52 have been allocated to it, but also to inform the SAU 14 of allocated traffic channels 52 in the reverse link direction. Traffic channels 42-1 ... 42-t on the forward link 40 are then used to carry payload information from the BSP 20 to the SAUs 14. Additionally, maintenance channels carry synchronization and power control information on the forward link 40 from the base station processor 20 to the SAUs 14.

Additional information as to one possible way to implement the various channels 41, 42, 43, 51, 52, and 53 is also provided in Patent Cooperation Treaty Application No. WO99/63682 entitled "Fast Acquisition Of Traffic Channels For A Highly Variable Data Rate," assigned to Tantivy Communications, Inc. and published Dec. 9, 1999.

The traffic channels 42 on the forward link 40 are shared in a Time Division Multiplex scheme among a number 8 the SAUs 14. Specifically, a typical forward link traffic channel 42 is partitioned into a pre-determined number of periodically repeating time slots 60-1, 60-2, ... 60-5 for transmission of messages to the multiple SAUs 14. It should be understood that a given SAU 14 may, at any instant in time, have multiple time slots 60 assigned to it or at other times may have no time slots at all assigned to it.

The allocation of time slots occurs on a demand basis among the various SAUs 14 in a physical area serviced by the system 10. The time slot assignments are typically determined by the Base Station Processor (BSP) 20 which is coordinating the assignment of resources to specific connections between users of the computers 12 and servers 30. These assignments are made based upon a number of factors, such as traffic demand, requested quality of service, and other factors.

The manner of assignment of a specific time slot 60 to a specific one of the SAUs 14 is not of importance to the present invention. Rather, the present invention is concerned with the manner in which a receiver such as a SAU 14 may correctly receive time slotted data on the forward link without having available to it specific information as to which time slots are assigned to other SAUs 14.

Figure 2A:
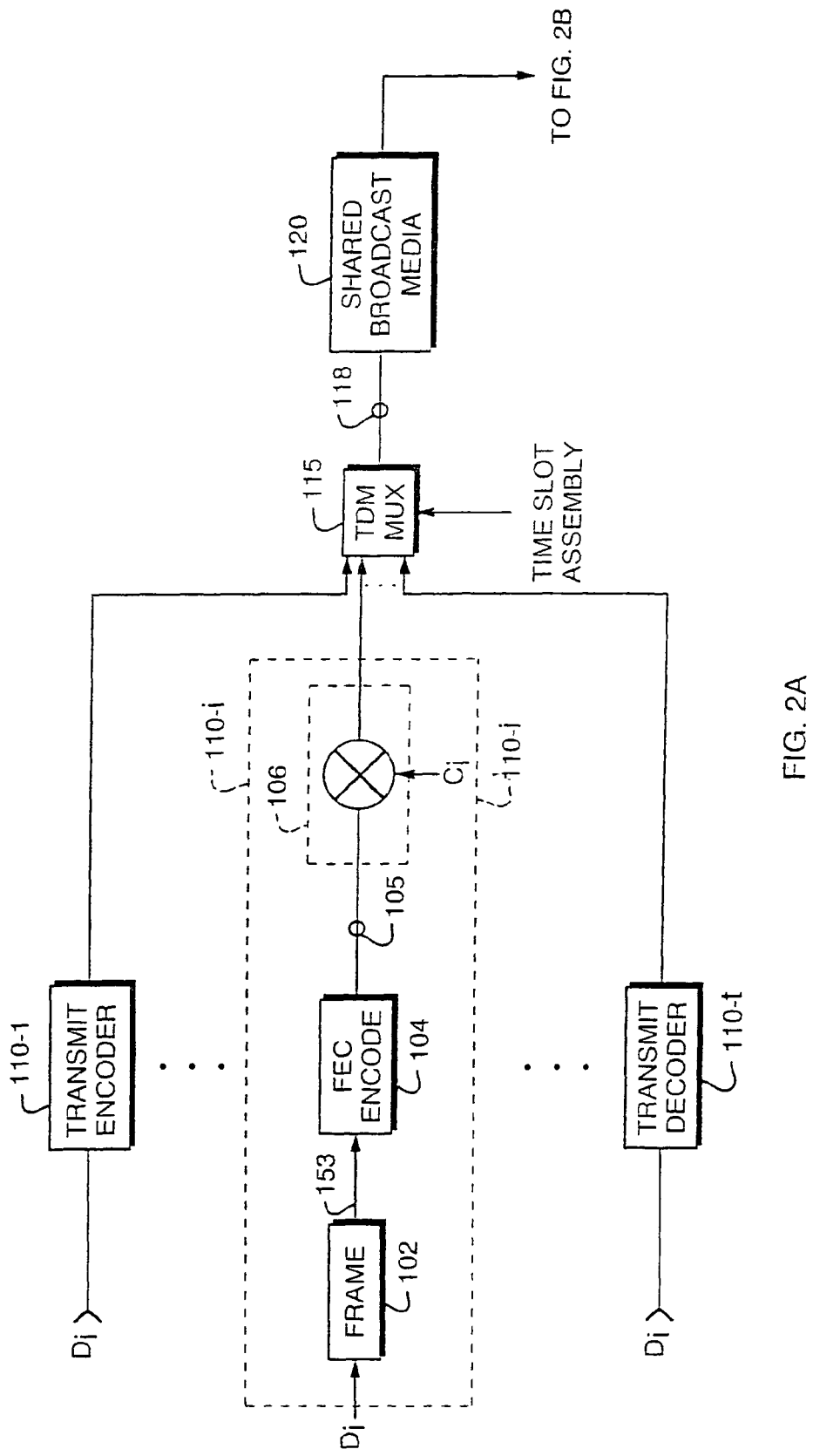
FIGS. 2A and 2B are more detailed diagrams of the transmitter encoding and receiver decoding.
Figure 2B:
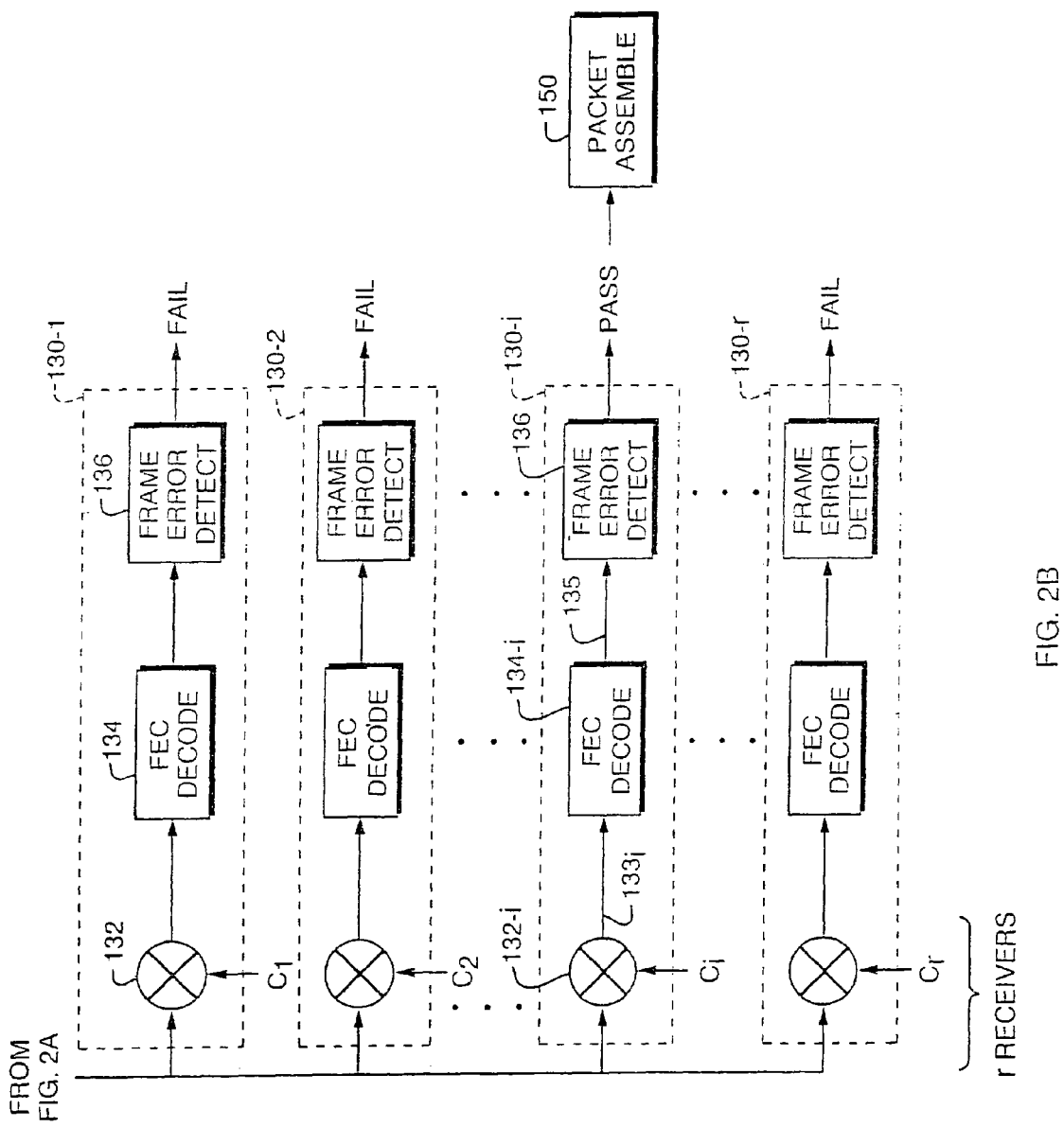

More particularly, refer now to FIGS. 2A and 2B where there is shown a generalized block diagram of the encoding process at the transmit side and decoding process at the receive side according to the invention. It should be understood that in accordance with the notation of FIGS. 2A and 2B, a transmitter 100 may, in the case of the forward link 40, be the Base Station Processor (BSP) 20 shown in FIG. 1. Likewise, the receivers 130 shown in FIGS. 2A and 2B are one or more of the SAUs 14 shown in FIG. 1.

At the transmitter 110, a packet containing the data to be transmitted to a specific receiver i ($D_i$) is first fed to a framer 102. The framer 102 divides the packet into sub-packets or frames. The number of bytes in each of the frames, and the number of frames per packet, and the packet size is not of particular importance to the present invention. Any number of techniques can be used to determine the optimum frame size and number of frames per packet.

In any event, the framed data is then fed to a Forward Error Correction encoder (FEC) 104. The FEC encoder 104 takes the framed data and adds additional bits to permit error detection at the receiver 130. Any number of FEC encoder processes may be used such as BCH codes, block codes, turbo codes, turbo product codes and the like.

The FEC encoded frame is then fed to a cover sequence circuit 106. The cover sequence modulator 106 applies a cover sequence, $C_i$ associated with the particular end-to-end connection that is to receive the data $D_i$. A number of different cover sequences C are associated with each of a number of different connections that can be carried over the shared broadcast media 120. The cover sequences $C_i$ may be any suitable sequence. For example, one class of such sequences are the long pseudorandom noise (PN) sequences. In such an instance, the cover sequence is applied by module-2 multiplication of the cover sequence $C_i$ with the data $D_i$. Suitable cover sequences may also include other near-orthogonal sequences that scramble the data. The cover sequence selected should scramble the data sufficiently to cause the FEC decoder 134 to fail to decode it properly if an incorrect cover sequence is applied at the receiver.

It should be understood then that the coded signals output from a number of transmitters 110 may then be applied to a time division multiplexer 115. Thus, output from a number of transmitters 110-1 ... 110i ... 110t may be fed as input to the TDM multiplexer 115 to assign time slots of the multiplexed signal 118 to particular ones of the transmitters 110. The time division multiplexed signal 118 is then fed over the shared broadcast media 120, to the receivers 130, which in the preferred embodiment is the forward link 40 described in FIG. 1.

A specific exemplary receiver 130-1 consists of a cover sequence circuit 132, an FEC decoder 134, and frame error detect 136. More specifically, the cover sequence circuit 132 applies the cover sequence $C_i$ associated with a particular receiver 130 to the signal that it receives. For example, consider the case of the receiver 130-$i$, which is the intended recipient for data sequence $D_i$. In order to properly receive the data $D_i$, cover sequence $C_i$ is fed to the respective cover sequence demodulator 132-$i$. In the case of using long PN codes, the cover sequence circuit performs a modulo-2 multiplication by the cover sequence. Other types of cover sequences may require different processing. In any event, the output of the cover sequence demodulator 132-$i$ is thus the same signal 105 that was presented to the input of the corresponding sequence modulator 106 in the transmitter 110-$i$.

The cover sequence signal 133-$i$ is then applied to the FEC decoder 134-$i$ to remove the FEC encoding applied at the transmitter 110. The result is a digital signal or set of bits that represents the input frame which was output by the framer 103 at the transmitter 110-$i$.

An error detect is then performed in block 136 to determine whether or not the received frame was received properly. In case that it was, the frame is marked as "passing" and then passed up to a higher lever packet assembler 150. The pocket assembler 150 will be described in greater detail in FIGS. 3-5.

In the normal course of processing (i.e., when no bit errors are experienced in transmission), only a single receiver 130-$i$ which is the intended receiver will receive a pass indication from the output of the frame error detect 136. The other frame error detectors 136-1, 136-2, . . . 136-$i$−1, 136-$i$+1, . . . , 136-R detect will, in the normal course of events, receive a fail indication. This is because only the receiver 130-$i$ (having associated with it the cover sequence $C_i$ which was used to encode the data at the transmitter 110-$i$) will cause proper output at the cover sequence demodulator 132-$i$. The other cover sequence circuits 132-1, . . . 132-$i$−1, 132-$i$+1, . . . , 132-R will scramble the received data such that the FEC decoder will request an error. Therefore, the frame error check process 136 associated with such other receivers will normally indicate that the frame detection failed.

Figure 3:
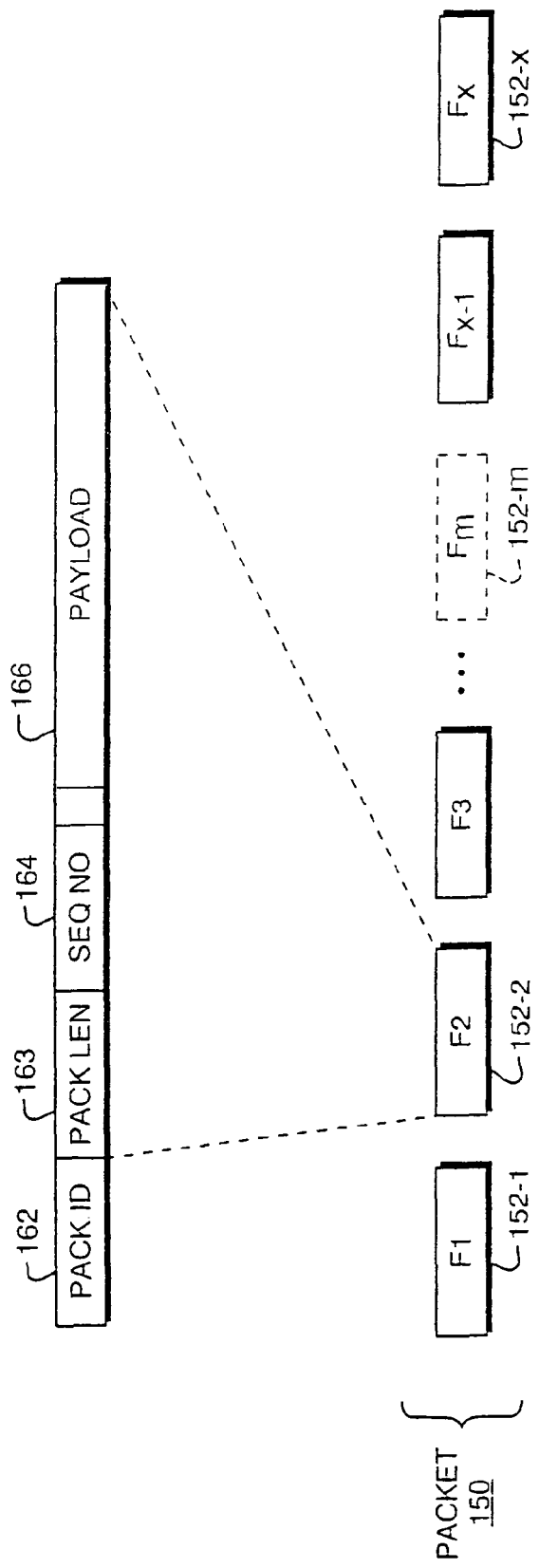
FIG. 3 illustrates the format of a packet and the frames contained therein.

Turning attention now to FIG. 3, the framing format for an exemplary data packet $D_i$ will be described prior to discussing the operation of the packet assembler 150 in detail. A packet 151 is divided into multiple frames 152-1, 152-2 . . . 152-M . . . 152-X at the transmitter 110. An exemplary frame 152-2 consists therefore of a section of payload data 166 taken from the packet 151 and additional information including at least a packet identifier field 162, a packet length field 163, a sequence number field 164, a Cyclic Redundancy Check (CRC) field 16.

A packet identifier 162 associated with each frame 152 indicates the particular packet with which the frame 152 is associated. The packet length field 163 indicates the length of the packet. The sequence number field 164 is a number indicating the particular order that the frame 152-2 occupies in the specific packet 151. For example, the sequence number within the frame 152-2 (being the second frame F2 in the packet 151) would be a binary representation of the number "2."

Figure 4:
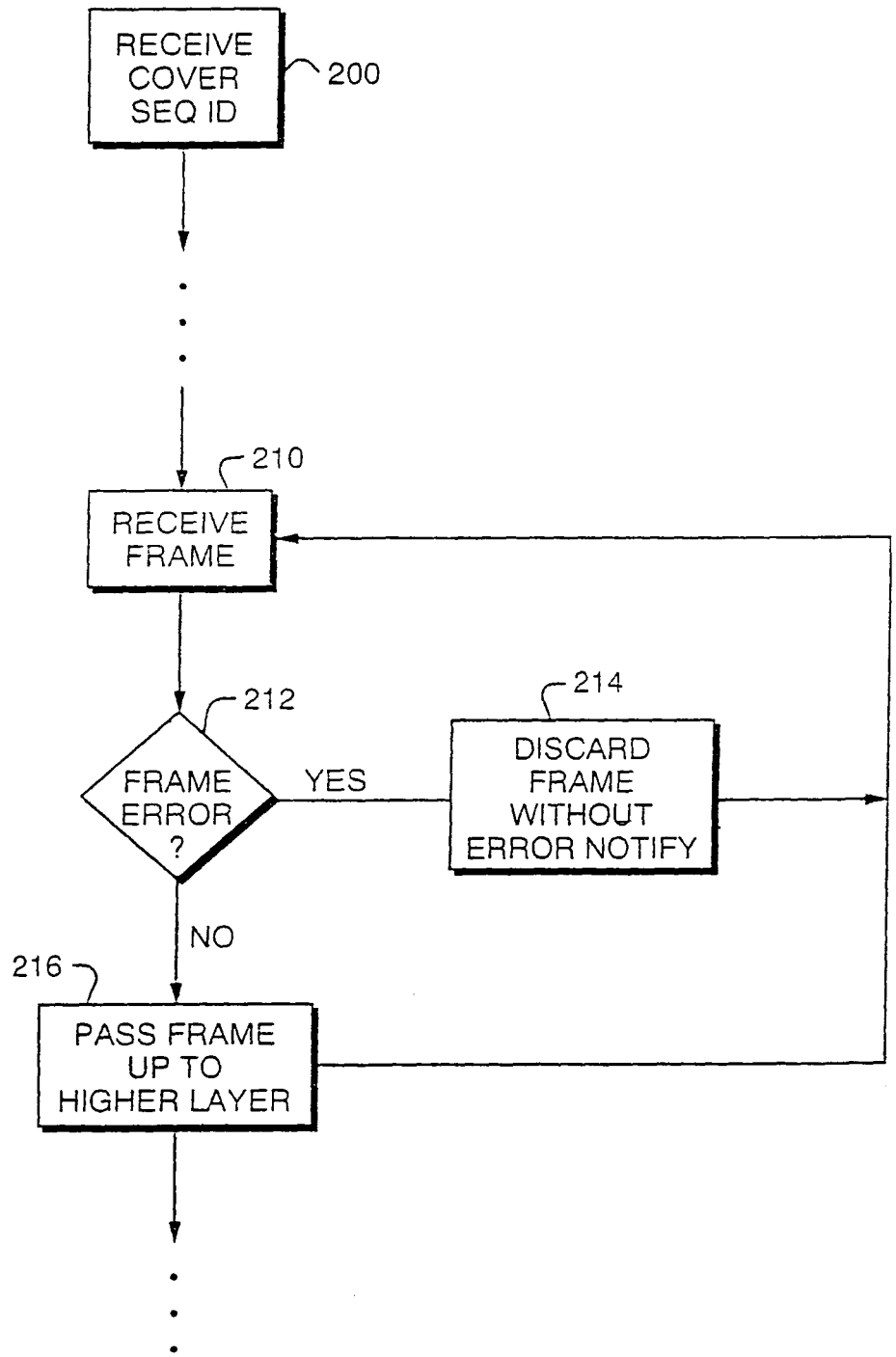
FIG. 4 is a flowchart of the operations performed by a lower layer protocol at the receiver.

FIG. 4 is a flow chart of the operations performed by the packet assembler 150 at a lower level layer of a protocol at the receiver 130. This protocol may typically be considered to be part of a link layer protocol that is responsible for assembling and properly detecting frames, as opposed to properly detecting the bits of each frame.

In a first step of this process, a given receiver 130-$i$ determines which cover sequence, $C_i$, is associated with it. This information may be provided to the receiver 130-$i$ on a paging channel 141 associated with the forward link, such as when the base station processor 20 initially sets up a connection between a particular subscriber access unit 14 and the server 30.

In other embodiments, the cover sequence $C_i$ can be pre-assigned to the particular receiver 130-$i$, such as during a system configuration process.

In any event, once activated, the receiver 130-$i$ enters a state 210 in which it is continuously receiving bits of the frames. Upon receipt of a complete frame, the process previously described for receiver 130-$i$ is performed, including the cover sequence circuit 132, FEC decoding 134, and frame error detect 136.

If, in state 212, the frame error detect 136 indicates that a frame error has occurred, then processing proceeds to state 214 in which the frame is discarded. However, not only is the frame discarded at this point, but it should be noted that no error indication is provided to a corresponding link layer back at the originator of the frame such as at the server 30, or to a higher layer at the receiver 130.

Back in state 212, if the frame was received without error, processing continues to state 216 in which the frame is passed up to a higher layer protocol at the receiver associated, for example, with the packet assembler 150 process.

Figure 5:
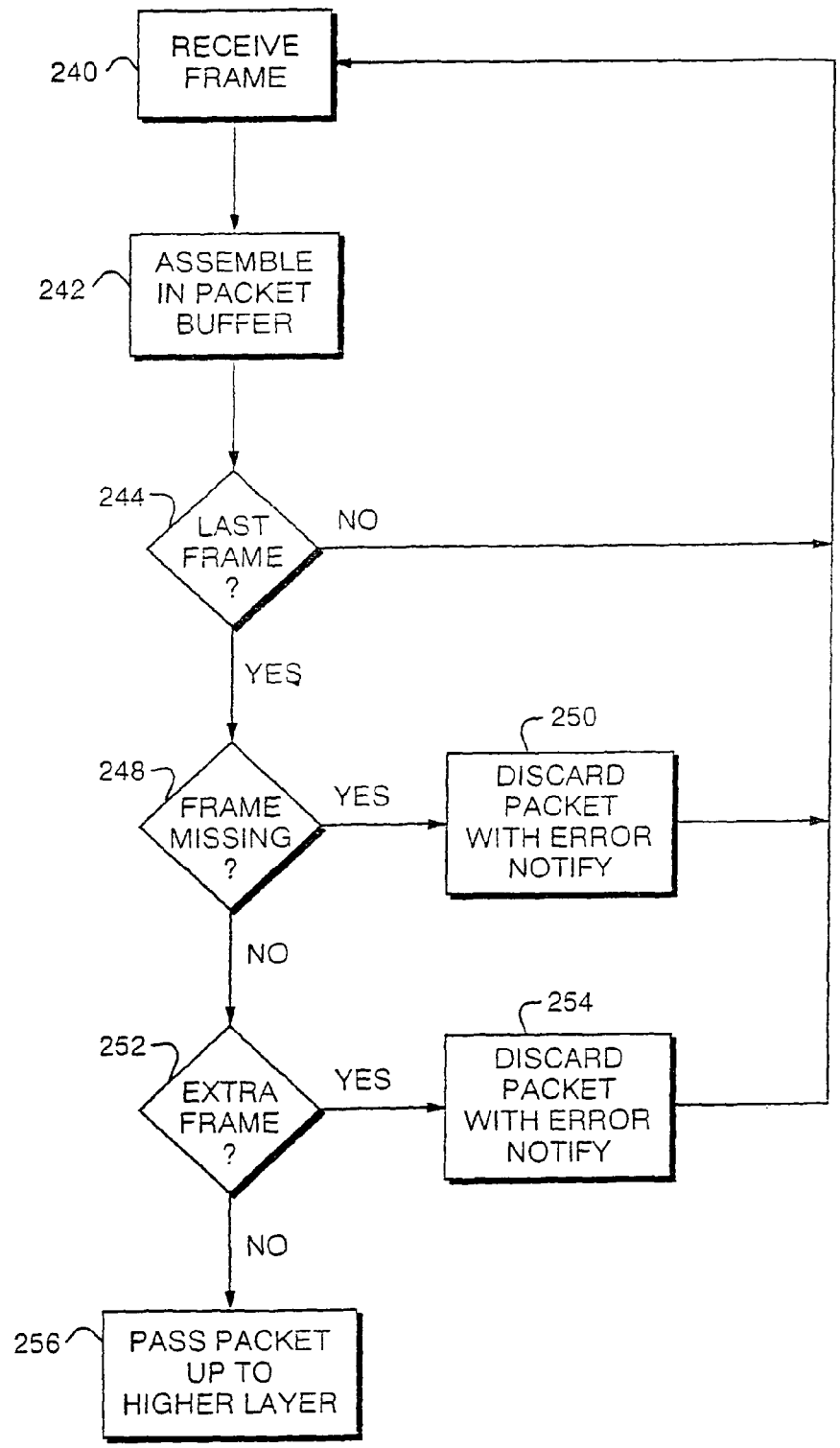
FIG. 5 is a flowchart of the operations performed by a higher layer protocol at the receiver.

FIG. 5 shows a flow chart of the steps performed by the packet assembler 150 to further complete the process according to the invention. Upon receipt of a frame, in state 240, a state 242 is next entered in which the frames are assembled to complete a packet. In state 244, if this is not the last frame of a packet, such as indicated by comparing the frame length information and the sequence number information in the packet, then processing returns to state 240. The process then continues, with the packet assembler 150 continuing to receive frames.

In state 244, which is entered upon an indication that the last frame has been received, then state 248 is entered in which it is determined whether or not a frame is missing. This determination can be made by examining the frame sequence numbers associated with each packet to determine if a frame is missing. Returning to FIG. 3, there may, for example, be in an assembled set of frames 152-1, 152-2, . . . 152-$x$, with a particular frame 152-$m$ which is still missing at the time frame the last frame 152-$x$ is received. This missing frame, $F_m$, can be due, for example, to errors which occur during transmission which caused it to be erroneously discarded by the frame error check process 136.

In any event, if there is a missing frame 152-$m$, then a state 250 is entered in which retransmission of the missing frame is requested. At this point, an error notification message is sent back to the appropriate higher level layer at the server 30. This higher level layer may, for example, be a network layer, a transport layer, or other protocol layer above the link layer.

From state 248, if there are no frames missing, but if an extra frame or out of sequence frame is received, such as again may be determined by comparing the packet identifier information 162 associated with each frame 152, then a state 252 is entered. In state 252, the out of order frame is discarded.

If there are no extra frames, that is, if all of the frames received do appear to be associated with a particular packet, then the packet has been properly received and it may be passed up to yet another, higher layer of the receiver protocol.

It should be understood that the steps 244, 248 and 252 may be performed in any particular order. For example, missing frame determination may be made before the last frame is received and/or out of order frame or frame associated with an incorrect packet determination may also be made before either of the other two determinations.

While this invention has been particularly shown and described with references to preferred embodiments thereof, it will be understood by those skilled in the art that various changes in form and details may be made therein without departing from the scope of the invention encompassed by the appended claims.

What is claimed is:

1. A code division multiple access (CDMA) subscriber unit comprising:
    a circuitry for receiving a shared channel, wherein the shared channel carries data in distinct time intervals, each time interval of the shared channel carries data for one specific CDMA subscriber unit, at least a portion of the data for the one specific CDMA subscriber unit is modulo-2 combined with a CDMA subscriber unit specific cover sequence associated with that one specific CDMA subscriber unit;
    a circuitry for receiving information for use in determining which CDMA subscriber unit specific cover sequence is associated with the CDMA subscriber unit, wherein the CDMA subscriber unit specific cover sequence determining information is received during a configuration process;
    a circuitry for discarding data of one of the time intervals of the received shared channel if an error is detected based on an error detection code; wherein the CDMA subscriber unit does not receive an assignment of the distinct time interval of the shared channels; and
    a circuitry for recovering data of one of the time intervals if an error is not detected based on the error detection code; wherein the recovered data includes a field including a first portion of a packet, a sequence number field and a length field; wherein a second portion of the packet is recovered by the circuitry configured to recover data in a different one of the time intervals and combine the first portion with at least the second portion to recover the packet.

2. The CDMA subscriber unit in claim 1 wherein the error detection code is a CRC.

3. The CDMA subscriber unit of claim 1 comprising circuitry configured to modulo-2 combine the CDMA subscriber unit specific cover sequence of the CDMA subscriber unit with the at least a portion of the one time interval to recover the data.

4. The CDMA subscriber unit of claim 3 wherein the data is recovered prior to the detecting of an error.

5. The CDMA subscriber unit of claim 1 wherein the data includes control information.

6. The CDMA subscriber unit of claim 1 comprising circuitry configured to pass the data to higher layers if an error is not detected.

7. The CDMA subscriber unit of claim 6 wherein the higher layers includes a link layer.

8. The CDMA subscriber unit of claim 1 wherein the time interval comprises at least one time slot.

9. The CDMA subscriber unit of claim 1 wherein no specific time interval assignment information associated with the shared channel is received by the CDMA subscriber unit.

10. The CDMA subscriber unit of claim 1 wherein the CDMA subscriber unit comprises a computer.

11. The CDMA subscriber unit of claim 10 wherein the computer comprises a handheld computer.

12. The CDMA subscriber unit of claim 10 wherein the computer comprises a PDA-type computer.

13. The CDMA subscriber unit of claim 10 wherein the computer comprises a laptop computer.

14. The CDMA subscriber unit of claim 10 wherein the computer is configured to run a browser program.

15. The CDMA subscriber unit of claim 1 comprising an antenna for receiving the shared channel as a wireless radio frequency signal.

16. A method for use by a code division multiple access (CDMA) subscriber unit, the method comprising:
    receiving a shared channel, wherein the shared channel carries data in distinct time intervals, each time interval of the shared channel carries data for one specific CDMA subscriber unit, at least a portion of the data for the one specific CDMA subscriber unit is modulo-2 combined with a CDMA subscriber unit specific cover sequence associated with that one specific CDMA subscriber unit;
    receiving information for use in determining which CDMA subscriber unit specific cover sequence is associated with the CDMA subscriber unit, wherein the CDMA subscriber unit specific cover sequence determining information is received during a configuration process;
    discarding data of one of the time intervals of the received shared channel if an error is detected based on an error detection code; wherein the CDMA subscriber unit does not receive an assignment of the distinct time interval of the shared channel;
    recovering data of one of the time intervals if an error is not detected based on the error detection code; wherein the recovered data includes a field including a first portion of a packet, a sequence number field and a length field; and
    recovering data of a second portion of the packet in a different one of the time intervals and combining the first portion with at least the second portion to recover the packet.

17. The method of claim 16 wherein the error detection code comprises a CRC.

18. The method of claim 16 comprising modulo-2 combining the subscriber unit specific cover sequence of the CDMA subscriber unit with the at least a portion of the one time interval to recover the data.

19. The method of claim 18 wherein the data is recovered prior to the detecting of an error.

20. The method of claim 16 wherein the data includes control information.

21. The method of claim 16 comprising passing the data to higher layers if an error is not detected.

22. The method of claim 21 wherein the higher layers includes a link layer.

23. The method of claim 16 wherein the time interval comprises at least one time slot.

24. The method of claim 16 wherein no specific time interval assignment information associated with the shared channels is received by the CDMA subscriber unit.

25. The method of claim 16 wherein the CDMA subscriber unit comprises a computer.

26. The method of claim 25 wherein the computer comprises a handheld computer.

27. The method of claim 25 wherein the computer comprises a PDA-type computer.

28. The method of claim 25 wherein the computer comprises a laptop computer.

29. The method of claim 25 wherein the computer is configured to run a browser program.

30. The method of claim 16 comprising receiving the shared channel as a wireless radio frequency signal by an antenna.

31. A code division multiple access (CDMA) base station comprising:
- a circuitry for transmitting a shared channel, wherein the shared channel carries data in distinct time intervals, each time interval of the shared channel carries data for one specific CDMA subscriber unit, at least a portion of the data for the one specific CDMA subscriber unit is modulo-2 combined with a CDMA subscriber unit specific cover sequence associated with that one specific CDMA subscriber unit; and
- a circuitry for transmitting information for use in determining which CDMA subscriber unit specific cover sequence is associated with a CDMA subscriber unit, wherein the CDMA subscriber unit specific cover sequence determining information is transmitted during a configuration process; and
- wherein the base station does not transmit an assignment of the distinct time interval of the shared channel and each distinct time interval includes an error detection code for use by the subscriber unit in error detection of the data of the shared channel; and
- a circuitry for splitting a packet into a first sub-packet and a second sub-packet; wherein each of the first and second sub packets include a portion of the packet, a sequence number field and a length field; wherein the first sub-packet is transmitted in a different distinct time interval to the CDMA subscriber unit than the second sub-packet.

* * * * *